United States Patent
Gadd et al.

(10) Patent No.: US 12,319,431 B2
(45) Date of Patent: Jun. 3, 2025

(54) RECOVERING FUEL VAPOUR FROM AIRCRAFT FUEL TANK

(71) Applicant: AIRBUS OPERATIONS LIMITED, Bristol (GB)

(72) Inventors: Matthew Gadd, Bristol (GB); Adam Fallon, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/470,763

(22) Filed: Sep. 20, 2023

(65) Prior Publication Data

US 2024/0092499 A1  Mar. 21, 2024

(30) Foreign Application Priority Data

Sep. 21, 2022 (GB) .................................. 2213790

(51) Int. Cl.
  *B64D 37/34* (2006.01)
  *B64D 37/14* (2006.01)
  *B64D 37/18* (2006.01)

(52) U.S. Cl.
  CPC ............. *B64D 37/34* (2013.01); *B64D 37/14* (2013.01); *B64D 37/18* (2013.01)

(58) Field of Classification Search
  CPC ........ B64D 37/34; B64D 37/18; B64D 37/14; B64D 37/20; B64D 37/32; B64F 1/28; B64F 1/36
  See application file for complete search history.

(56) References Cited

U.S. PATENT DOCUMENTS

| 2,965,196 | A | 12/1960 | Rich, Jr. |
| 5,117,876 | A | 6/1992 | Kuntz |
| 5,176,002 | A | 1/1993 | O'Brien et al. |
| 5,575,441 | A | 11/1996 | Gervais et al. |
| 8,434,721 | B2 | 5/2013 | Glaser |
| 2006/0237591 | A1* | 10/2006 | McCoskey ............... B64C 25/42 244/135 R |
| 2007/0000557 | A1* | 1/2007 | Kuntz ....................... B64F 1/28 141/65 |
| 2012/0025026 | A1 | 2/2012 | French |

(Continued)

FOREIGN PATENT DOCUMENTS

| DE | 4205433 A1 | 8/1993 |
| KR | 20000018332 A | 4/2000 |
| WO | 2021070099 A1 | 4/2021 |

OTHER PUBLICATIONS

EP Search Report for Application EP 23 19 6648, eight pages, dated Jan. 29, 2024.

(Continued)

*Primary Examiner* — Rodney A Bonnette
(74) *Attorney, Agent, or Firm* — Nixon & Vanderhye P.C.

(57) ABSTRACT

A method of recovering fuel vapour from a fuel tank of an aircraft, is disclosed. The aircraft includes a fuel tank; a wing with an upper surface and a lower surface; and an opening in the lower surface of the wing. The method includes coupling an inlet of a vapour recovery system to the opening; capturing fuel vapour from the fuel tank which flows out of the opening with the inlet of the vapour recovery system; and collecting the captured fuel vapour in a vapour storage tank of the vapour recovery system.

18 Claims, 3 Drawing Sheets

(56) References Cited

U.S. PATENT DOCUMENTS

| 2012/0043425 | A1* | 2/2012 | Beck | B64F 1/28 |
| | | | | 244/135 A |
| 2013/0119202 | A1* | 5/2013 | French | B64D 37/16 |
| | | | | 244/135 A |
| 2014/0238501 | A1* | 8/2014 | Tichborne | B64D 37/32 |
| | | | | 137/12 |

OTHER PUBLICATIONS

Otsuka et al., "Occupational Exposure to Gaseous and Aerosolized Volatile Organic Compounds in Flight Line Crews Using Different Types of Jet Fuel", <https://www.jstage.jst.go.jp/article/sujms/29/3/29_231/_pdf/-char/en>, Showa University Journal of Medical Science 29(3), pp. 231-240, Sep. 2017.
Combined Search and Examination Report for GB2213790.5 dated Mar. 9, 2023, 6 pages.

* cited by examiner

RECOVERING FUEL VAPOUR FROM AIRCRAFT FUEL TANK

CROSS RELATED APPLICATION

This application claims priority to United Kingdom Patent Application GB 2213790.5, filed Sep. 21, 2022, the entire contents of which is hereby incorporated by reference.

FIELD OF THE INVENTION

The invention relates to a method, and associated apparatus, for recovering fuel vapour from a fuel tank of an aircraft.

BACKGROUND OF THE INVENTION

Fuel vapour emissions from an aircraft can contain a mixture of volatile organic compounds.

The present invention seeks to reduce such emissions, providing a beneficial effect on the local environment at an airport.

SUMMARY OF THE INVENTION

A first aspect of the invention provides a method of recovering fuel vapour from a fuel tank of an aircraft, the aircraft comprising: a fuel tank; a wing with an upper surface and a lower surface; and an opening in the lower surface of the wing, the method comprising: coupling an inlet of a vapour recovery system to the opening; capturing fuel vapour from the fuel tank which flows out of the opening with the inlet of the vapour recovery system; and collecting the captured fuel vapour in a vapour storage tank of the vapour recovery system.

Optionally the inlet of the vapour recovery system surrounds the opening.

Optionally the inlet of the vapour recovery system is coupled to the opening without plugging it into the opening.

Optionally the inlet of the vapour recovery system contacts the lower surface of the wing.

Optionally the inlet of the vapour recovery system contacts a planar part of the lower surface of the wing.

Optionally the inlet of the vapour recovery system comprises one or more suction cups which attach the inlet of the vapour recovery system to the lower surface of the wing by suction force.

Optionally the lower surface of the wing carries one or more brackets which protrude from the lower surface of the wing; and the inlet of the vapour recovery system is attached to the lower surface of the wing via the bracket(s).

Optionally the aircraft further comprises a vent tank, and the fuel vapour flows from the fuel tank to the opening via the vent tank.

Optionally the method further comprises feeding air into the fuel tank via the opening during flight of the aircraft.

Optionally the vapour storage tank is a vapour storage tank of a land-based vehicle.

Optionally the method further comprises, after the fuel vapour has been collected in the vapour storage tank: decoupling the inlet from the opening; driving the land-based vehicle to a storage silo; and feeding the captured fuel vapour from the vapour storage tank of the land-based vehicle into the storage silo.

Optionally the vapour recovery system comprises a vapour recovery hose which feeds the fuel vapour from the inlet into the vapour storage tank.

Optionally the method further comprises feeding liquid fuel into the fuel tank, wherein the fuel vapour is captured as the liquid fuel is fed into the fuel tank.

Optionally the method further comprises capturing liquid fuel which overspills from the fuel tank and flows out of the opening and into the inlet of the vapour recovery system; and collecting the captured liquid fuel in the vapour storage tank of the vapour recovery system.

A first aspect of the invention provides a vapour recovery system for recovering fuel vapour from a fuel tank of an aircraft, the vapour recovery system comprising: a vapour storage tank; and a hose assembly with an inlet and an outlet, wherein the inlet is configured to be coupled to an opening in a lower surface of a wing of the aircraft, and the outlet is configured to feed fuel vapour captured by the inlet into the vapour storage tank.

Optionally the inlet comprises one or more suction cups configured to attach to the lower surface of the wing of the aircraft.

A further aspect of the invention provides a land-based vehicle comprising a vapour recovery system according to the previous aspect.

Optionally the land-based vehicle further comprises a liquid fuel delivery system configured to feed liquid fuel into the fuel tank of the aircraft.

BRIEF DESCRIPTION OF THE DRAWINGS

Embodiments of the invention will now be described with reference to the accompanying drawings, in which.

DETAILED DESCRIPTION OF EMBODIMENTS

Figure 1:
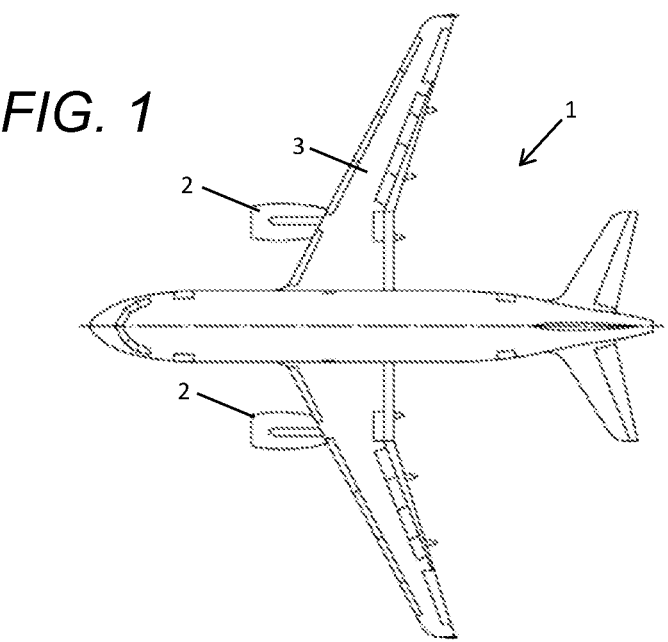
FIG. 1 is a plan view of an aircraft.
Figure 2:
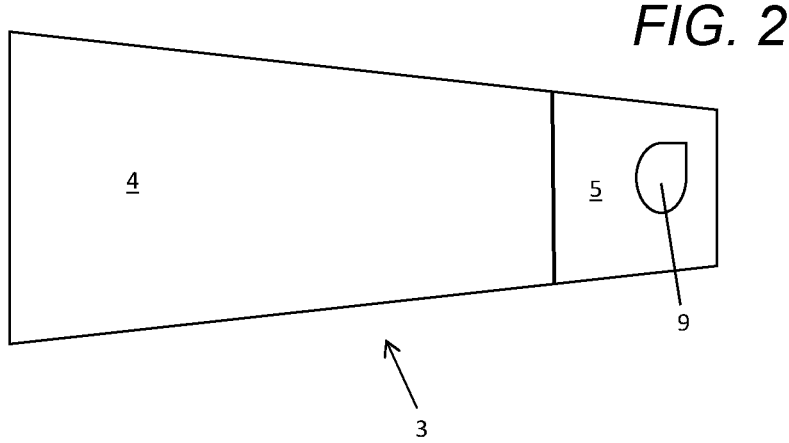
FIG. 2 is a schematic view of an underside of a wing of the aircraft.
Figure 3:
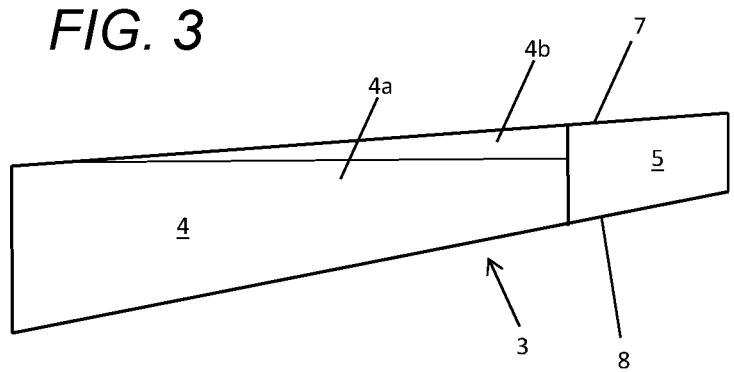
FIG. 3 is a schematic view showing liquid fuel in the wing, viewed from the front.

An aircraft 1 shown in FIG. 1 comprises a pair of wings extending from a fuselage. The aircraft comprises a fuel system for feeding fuel to wing-mounted engines 2. The fuel system comprises one or more fuel tanks in each wing, and a centre-tank. FIGS. 2 and 3 are schematic views showing the fuel system in the starboard wing 3.

The fuel system comprises a fuel tank 4 and a vent tank 5, separated by a boundary wall. The fuel tank 4 can be filled with liquid hydrocarbon aviation fuel 4a and contains pumps (not shown) for feeding the fuel to the engine 2. An ullage 4b above the fuel contains fuel vapour which can flow into the vent tank 5. The fuel vapour comprises a mixture of volatile organic compounds mixed with air and/or inert gas (such as Nitrogen) from a fuel tank inerting system (not shown).

The wing 3 has an upper skin 7 and a lower skin 8. The upper surface of the upper skin 7 provides the aerodynamic upper surface of the wing, and the lower surface of the lower skin 8 provides the aerodynamic lower surface of the wing. The vent tank 5 has a NACA duct with an opening 9 in the lower skin 8, so the vent tank 5 is in fluid communication with the atmosphere via the NACA duct.

Figure 4:
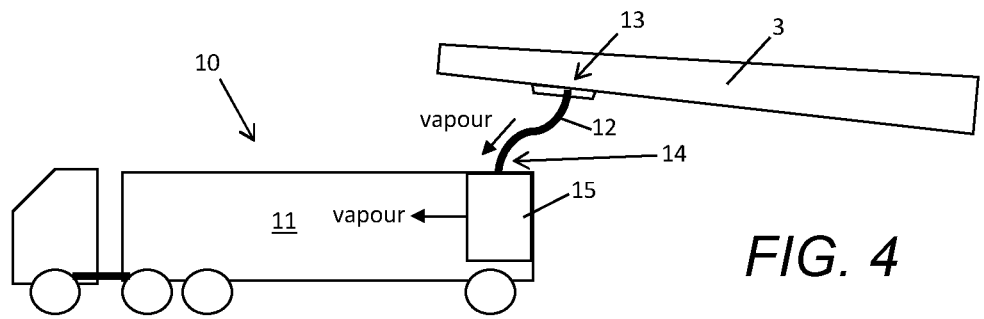
FIG. 4 shows a method of recovering fuel vapour with a dedicated collection truck.

A method of recovering fuel vapour from the fuel tank 4 is shown in FIG. 4.

A dedicated collection truck 10 with a vapour recovery system is driven to the parked aircraft as shown in FIG. 3. The vapour recovery system comprises a vapour storage tank 11; a hose assembly comprising a vapour recovery hose 12, an inlet 13 and an outlet 14; and a fan 15. The inlet 13 is configured to be coupled to the opening 9 in the lower surface of the wing of the aircraft, as shown in FIG. 4. The outlet 14 is configured to feed fuel vapour captured by the inlet 13 into the vapour storage tank 11, where it is collected.

Figure 5:
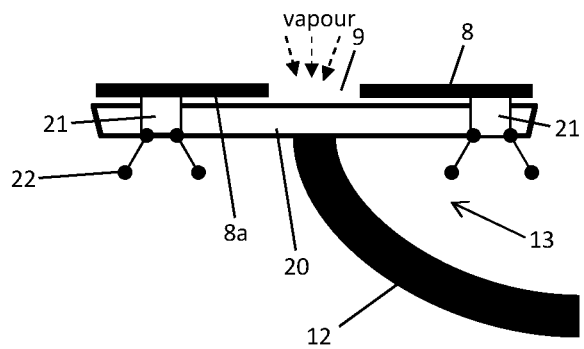
FIG. 5 shows an inlet with suction cups.

FIG. 5 shows a first embodiment of the inlet 13. In this case the inlet 13 comprises a funnel 20 with suction cups 21 which attach the inlet 13 to the lower surface 8a of the wing by suction force. Each suction cup has a pair of levers 22 which can be used to push the suction cup 21 flat against the lower surface 8a to create the suction force. Each suction cup 21 contacts a planar part of the lower surface 8a to ensure a tight seal.

The funnel 20 is attached to the lower surface 8a of the wing so that it surrounds the opening 9.

Only two suction cups 21 are shown in the plane of the schematic cross-section of FIG. 5, but optionally further suction cups (not shown) may be provided out of the plane of the cross-section. In a further alternative, instead of multiple suction cups 21, the funnel 20 may comprise a single annular suction cup extending round the full periphery of the inlet 13.

Figure 6:
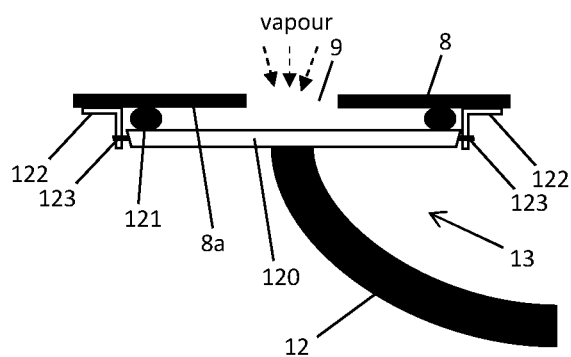
FIG. 6 shows an inlet with attachment pins.

FIG. 6 shows an alternative form for the inlet 13. The inlet 13 of FIG. 6 comprises a funnel 120 with an annular elastomeric seal 121 which contacts the lower surface 8a.

The wing carries brackets 122 which protrude from the lower surface 8a; and the inlet 13 is attached to the lower surface of the wing via these bracket(s) 122 and removable pins 123.

Although the brackets 122 protrude into the airflow from the lower surface 8a of the wing, they have a minimal effect on the aerodynamic performance of the wing because the lower surface is less aerodynamically important than the upper surface.

Only two brackets 122 and pins 123 are shown in the plane of the schematic cross-section of FIG. 6, but optionally further brackets and pins (not shown) may be provided out of the plane of the cross-section.

Figure 7:
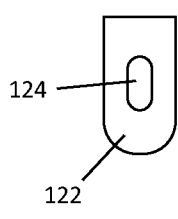
FIG. 7 is a front view of one of the brackets.
Figure 8:
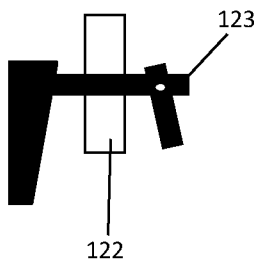
FIG. 8 is a side view showing one of the pins.

FIG. 7 is a front view of one of the brackets 122 showing a hole 124 which receives one of the pins 123. FIG. 8 is a side view showing one of the pins 123 in more detail.

After the inlet 13 has been coupled to the opening 9, fuel vapour from the fuel tank 4 and the vent tank 5 which flows out of the opening 9 is captured by the inlet 13 as shown in FIGS. 5 and 6. The captured fuel vapour then flows into the vapour storage tank 11 via the vapour recovery hose 12 and the outlet 14. The storage tank 11 may be pressurised.

Optionally the outlet 14 is coupled to a fan 15 (or pump) which is operated to suck the fuel vapour from the fuel tank 4 and the vent tank 5 at low pressure.

Figure 9:
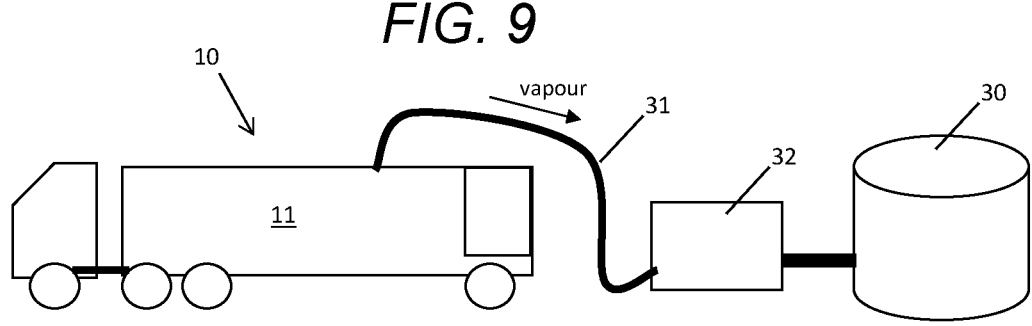
FIG. 9 shows collected fuel vapour being transferred from the dedicated collection truck into a storage silo.

After the fuel vapour has been captured in the vapour storage tank 11, the inlet 13 is decoupled from the opening 9 and detached from the lower surface 8a of the wing, and the truck 10 is driven to a storage silo 30 as shown in FIG. 9.

In the event that the truck 10 is driven away before the inlet 13 has been detached, the suction cups 21 will release easily, or the pins 123 will shear easily, to avoid damage to the wing.

The fuel vapour which has been collected in the vapour storage tank 11 is then fed into the storage silo 30 via a hose 31 and a vapour recovery unit (VRU) 32 which compacts the gas into a smaller volume. Typically the VRU comprises a gas compressor, a scrubber, Variable Frequency Drives (VFDs) and a switching device. The VRU 32 may be mechanically driven and powered by an electric motor or gas engine.

Figure 10:
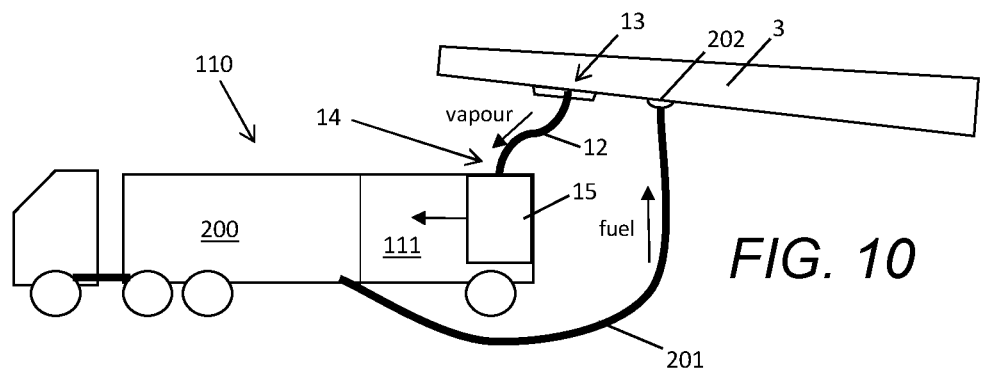
FIG. 10 shows a method of recovering fuel vapour with a combined fuelling and vent emissions collection truck.

An alternative method of recovering fuel vapour from the fuel tank 4 is shown in FIG. 10.

A combined fuelling and vent emissions collection truck 110 with a vapour recovery system is driven to the parked aircraft. The vapour recovery system comprises: a vapour storage tank 111; a hose assembly comprising a vapour recovery hose 12, an inlet 13, and an outlet 14; and a fan 15. The hose assembly 12-14 and fan 15 may be the same as in the previous embodiments, so will not be described again.

The truck 110 further comprises a liquid fuel delivery system comprising a fuel storage tank 200, and a refuel hose 201 with a refuel coupling device 202.

The truck 110 is driven to the parked aircraft as shown in FIG. 10. The refuel hose 201 is coupled to a fuel inlet on the lower surface of the wing 3, and the vapour recovery hose 12 is coupled to the NACA duct as in the previous embodiment.

As liquid kerosene fuel is fed into the fuel tank 4 from the fuel storage tank 200 via the refuel hose 201, fuel vapour is displaced from the fuel tank 4 and the vent tank 5. This displaced fuel vapour is captured by the vapour recovery system 12-15 and collected in the vapour storage tank 111.

The flow of fuel vapour into the vapour storage tank 111 may be driven by the pressure differential created by the refuelling process, and/or by operation of the fan 15.

After filling the fuel tank 4, liquid fuel may continue to be fed into the fuel tank 4 due to system failure or human error. This will cause liquid fuel to overspill from the fuel tank 4, then out of the opening 9 via the vent tank 5. In this case, the liquid fuel which overspills from the fuel tank and flows out of the opening 9 and into the inlet 13 of the vapour recovery system may be collected in the vapour storage tank 111. This provides safety benefits, and environmental benefits (preventing groundwater pollution).

Figure 11:
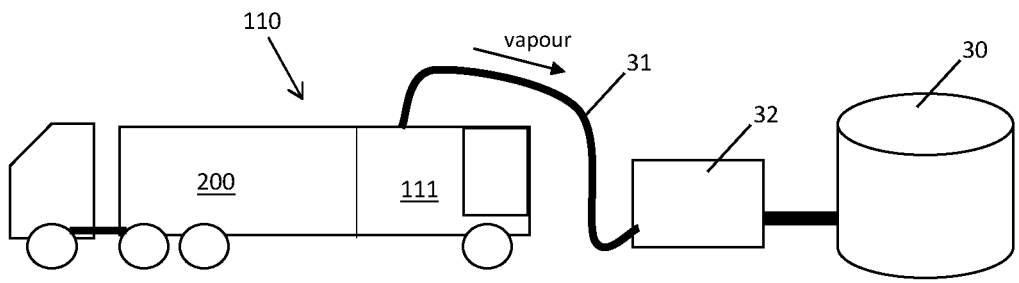
FIG. 11 shows collected fuel vapour being transferred from the combined fuelling and vent emissions collection truck into the storage silo.

After the fuel vapour has been captured in the vapour storage tank 111, the inlet 13 is detached from the lower surface 8a of the wing, and the truck 110 is driven to the storage silo 30 as shown in FIG. 11. The fuel vapour which has been collected in the vapour storage tank 111 is then fed into the storage silo 30.

Conveniently the storage silo 30 may be located at an airport fuel farm, so the fuel storage tank 200 can also be refilled at the airport fuel farm.

After the fuel tank 4 has been filled, the NACA duct may operate in a conventional fashion during flight of the aircraft, for example feeding air into the fuel tank 4 via the opening 9 and/or releasing fuel vapour from the fuel tank 4 into the atmosphere via the opening 9.

It has been realised that the NACA duct opening 9 in the lower surface 8a of the wing is well suited to be used for vapour recovery for two reasons. Firstly, the opening 9 is easily accessible from the ground below the wing; and secondly the lower surface 8a of the wing is less aerodynamically critical than the upper surface of the wing, so any minor damage caused by the inlet 13 will not significantly impair the aerodynamic performance of the wing.

In other embodiments of the invention, the inlet of the vapour recovery system may be coupled to the opening 9 by plugging it into the opening 9 (with or without contacting the lower surface 8a of the wing). In such embodiments, the inlet will only be suitable for a NACA duct of a certain shape or size. Coupling the inlet 13 to the opening 9 without plugging it into the opening 9 is more preferred because it makes it possible to easily use the vapour recovery system to recover vapour from a wide variety of aircraft, each with different NACA ducts.

In the embodiments above the vapour recovery system is provided as part of a land-based vehicle (a truck) but in other embodiments the vapour recovery system may be static equipment provided at the gate or another part of an airport.

The vapour recovery systems described above reduce emissions of fuel vapour, providing a beneficial effect on the local environment at an airport.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A method of recovering fuel vapour from a fuel tank of an aircraft, the aircraft comprising: a fuel tank; a wing with an upper surface and a lower surface; and an opening in the lower surface of the wing, the method comprising: coupling an inlet of a vapour recovery system to the opening; capturing fuel vapour from the fuel tank which flows out of the opening with the inlet of the vapour recovery system; and collecting the captured fuel vapour in a vapour storage tank of the vapour recovery system, wherein the inlet of the vapour recovery system is coupled to the opening without plugging it in to the opening.

2. A method according to claim 1, wherein the inlet of the vapour recovery system surrounds the opening.

3. A method according to claim 1, wherein the inlet of the vapour recovery system contacts the lower surface of the wing.

4. A method according to claim 1, wherein the inlet of the vapour recovery system contacts a planar part of the lower surface of the wing.

5. A method according to claim 1, wherein the inlet of the vapour recovery system comprises one or more suction cups which attach the inlet of the vapour recovery system to the lower surface of the wing by suction force.

6. A method according to claim 1, wherein the lower surface of the wing carries one or more brackets which protrude from the lower surface of the wing; and the inlet of the vapour recovery system is attached to the lower surface of the wing via the bracket(s).

7. A method according to claim 1, wherein the aircraft further comprises a vent tank, and the fuel vapour flows from the fuel tank to the opening via the vent tank.

8. A method according to claim 1, further comprising feeding air into the fuel tank via the opening during flight of the aircraft.

9. A method according to claim 1, wherein the vapour storage tank is a vapour storage tank of a land-based vehicle.

10. A method according to claim 9, further comprising, after the fuel vapour has been collected in the vapour storage tank: decoupling the inlet from the opening; driving the land-based vehicle to a storage silo; and feeding the captured fuel vapour from the vapour storage tank of the land-based vehicle into the storage silo.

11. A method according to claim 1, wherein the vapour recovery system comprises a vapour recovery hose which feeds the fuel vapour from the inlet into the vapour storage tank.

12. A method according to claim 1, further comprising feeding liquid fuel into the fuel tank, wherein the fuel vapour is captured as the liquid fuel is fed into the fuel tank.

13. A method according to claim 1, further comprising capturing liquid fuel which overspills from the fuel tank and flows out of the opening and into the inlet of the vapour recovery system; and collecting the captured liquid fuel in the vapour storage tank of the vapour recovery system.

14. A vapour recovery system for recovering fuel vapour from a fuel tank of an aircraft, the vapour recovery system comprising: a vapour storage tank; a hose assembly with an inlet and an outlet, and a fan or pump coupled to the outlet; wherein the inlet is configured to be coupled to an opening in a lower surface of a wing of the aircraft without plugging it in to the opening, and the outlet is configured to feed fuel vapour captured by the inlet into the vapour storage tank.

15. A vapour recovery system according to claim 14, wherein the inlet comprises one or more suction cups configured to attach to the lower surface of the wing of the aircraft.

16. A land-based vehicle comprising a vapour recovery system according to claim 14.

17. A land-based vehicle according to claim 16, further comprising a liquid fuel delivery system configured to feed liquid fuel into the fuel tank of the aircraft.

18. A method of recovering fuel vapour from a fuel tank of an aircraft, the aircraft comprising: a fuel tank; a wing with an upper surface and a lower surface; and an opening in the lower surface of the wing, the method comprising: coupling an inlet of a vapour recovery system to the opening without plugging it in to the opening; capturing fuel vapour from the fuel tank which flows out of the opening with the inlet of the vapour recovery system; and collecting the captured fuel vapour in a vapour storage tank of the vapour recovery system, wherein the inlet of the vapour recovery system surrounds the opening.

* * * * *